May 4, 1926.

L. B. HARVEY 1,583,461

COMBINED VACUUM TANK AND LIQUID METER

Filed Feb. 12, 1924     2 Sheets-Sheet 2

INVENTOR.
Louis B. Harvey
BY
ATTORNEY

Patented May 4, 1926.

1,583,461

UNITED STATES PATENT OFFICE.

LOUIS B. HARVEY, OF SACRAMENTO, CALIFORNIA.

COMBINED VACUUM TANK AND LIQUID METER.

Application filed February 12, 1924. Serial No. 692,284.

*To all whom it may concern:*

Be it known that I, LOUIS B. HARVEY, a citizen of the United States, residing at Sacramento, county of Sacramento, State of California, have invented certain new and useful Improvements in Combined Vacuum Tanks and Liquid Meters; and I do declare the following to be a full, clear, and exact description of the same, reference being had to the accompanying drawings, and to the characters of reference marked thereon, which form a part of this application.

This invention relates to improvements in liquid fuel supplying and metering devices especially intended for use in connection with motor vehicles to take the place of the usual vacuum tank interposed between the main fuel supply and the engine carbureter, and by means of which the amount of fuel used is positively metered and indicated.

My present invention is particularly an improvement over that type of device for the same purpose, shown in my copending application for patent filed April 23rd, 1923, Serial No. 634,087. My main object now is to provide a device of this character in which the number of parts is reduced to a minimum, the action of the parts is positive and not dependent to any degree upon fine adjustments, and no liquid-tight joints other than a few ordinary ones, such as pipe connections, are necessary.

With the movable parts of my device as now arranged, the working of the same is not so sensitive, and hence not so liable to dearrangement or failure to function as in the pevious apparatus, and the construction may be of a substantial nature without detracting from its efficient operation.

By greatly reducing the number of parts, the cost of the device is correspondingly reduced, while the size and shape of the apparatus as a unit is now about the same as that of the present vacuum tank, instead of being odd shaped as before.

This enables my device to be installed in the same place now occupied by the usual vacuum tank, without having to mount the device in a different location or rearranging any other attachments on the vehicle located adjacent the tank.

These objects I accomplish by means of such structure and relative arrangement of parts as will fully appear by a perusal of the following specification and claims.

In the drawings similar characters of reference indicate corresponding parts in the several views.

Figure 1:
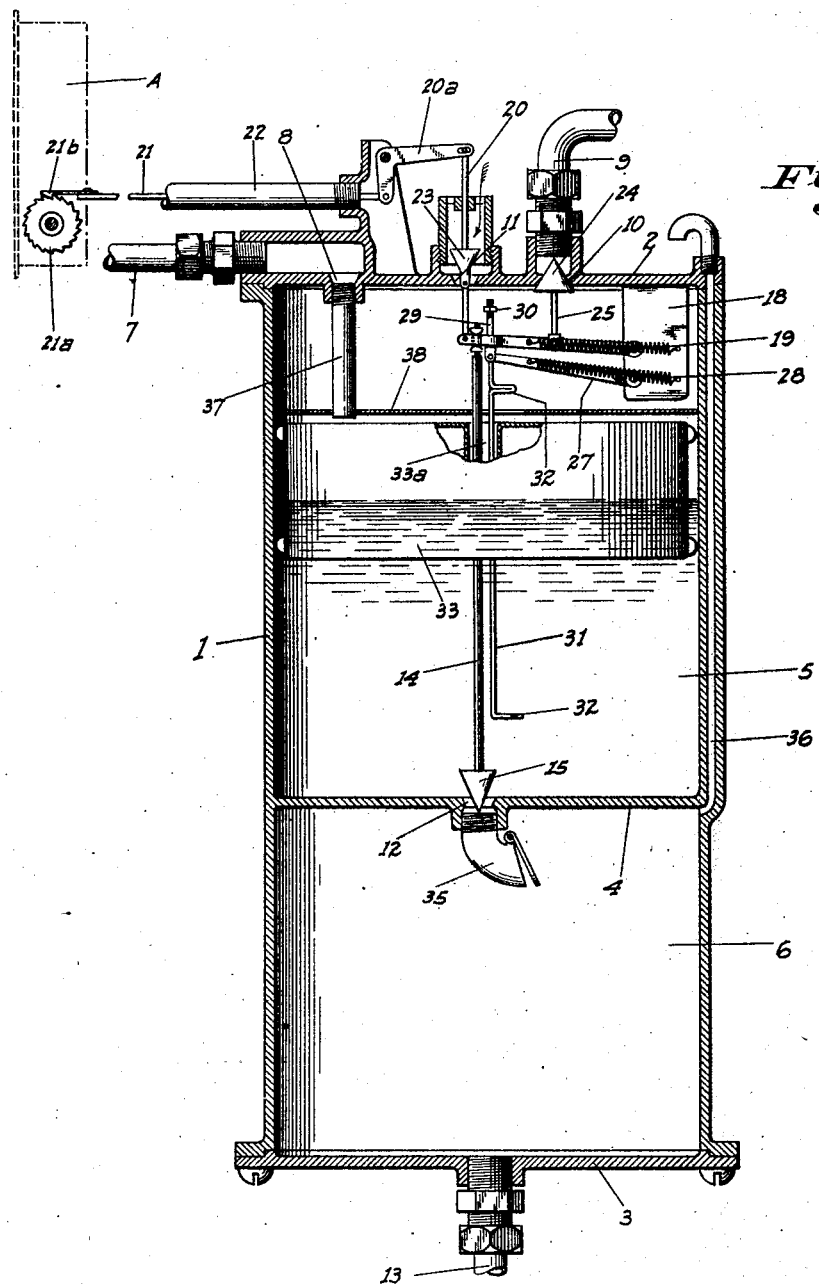
Fig. 1 is a sectional elevation of the device, with the metering chamber full and the float up.

Referring now more particularly to the characters of reference on the drawings, the numeral 1 denotes a vertical casing, having top and bottom covers 2 and 3 and an intermediate transverse wall or partition 4, dividing the casing into upper and lower vertically spaced and separate chambers 5 and 6 respectively.

Connected to the cover 2 is a fuel supply pipe 7 leading from the main tank, and communicating with the chamber 5 by means of an opening 8. A suction pipe 9 is also connected to the cover 2, communicating with chamber 5 by means of a valve-seat opening 10.

Another valve-seat opening 11 in the cover 2 communicates directly with the atmosphere.

The partition 4 has a valve-seat opening 12 therethrough.

A fuel outlet pipe 13 is connected to the bottom cover 3 and leads to the carbureter.

In the chamber 5 is a vertical stem 14 having a valve head 15 on its lower ends, adapted to seat in the opening 12, said valve opening inwardly of the chamber 5.

The stem 14 is somewhat freely connected to a substantially horizontal lever 17 adjacent the free end thereof, said lever being pivoted at its opposite end of a fixed boss 18, preferably formed with or attached to the cover 2. Spring means 19 acts on said lever to hold the same either above or below a dead-center position.

Also attached to the lever 17 is a stem 20 passing through the air opening 11 and attached at its upper end to a bellcrank 20ª or the like which in turn is attached to a pull rod 21 passing through sleeve 22 attached to the cover 2.

The rod 21 is arranged, with alternate longitudinal movements thereof, to operate the mechanism of any suitable form of metering or indicating mechanism operating on the well-known Veeder principle, the casing of which is indicated at A in Fig. 1.

The particular form of such mechanism, or its connection with said rod, forms no part of my present invention.

For the purposes of illustration however, the operating means may comprise a ratchet wheel 21ª mounted in the casing A and connected to the recording mechanism therein, and a resiliently mounted pawl 21ᵇ on the outer end of the pull rod and engaging said wheel.

Also mounted on the stem 20 is a valve-head 23, adapted to seat in the opening 11 with a downward movement of said stem.

A valve-head 24, adapted to close the opening 10 with an upward movement, is supported from the lever 17 by a stem 25.

Another horizontal lever 27 is pivoted at one end on the boss 18, preferably below the lever 17, the lever 27 having spring means 28, stronger than the spring 19, acting to hold lever 27 either above or below a dead center position. This lever may be termed the control or trip lever.

At the outer end of lever 27 is a vertical stem 29, passing through lever 17, the lower end of said stem being shouldered while the upper end has a vertically adjustable head 30 adapted to engage the upper face of lever 17.

Depending from the lever 27 is a vertical stem 31 having vertically spaced stops 32 thereon. A float 33, having an easy working fit in the chamber 5, surrounds said stem and is movable between and adapted to abut against said stops. To permit of rotative movement of the float without any binding on the stems 14 and 31 being had, both said stems pass through a common central office 33ª in the float.

Projecting into the chamber 6 and communicating with the opening 12 is preferably placed an automatically operating flap-valve member 35, opening away from said opening 12. An air vent 36 extends from the top of the chamber 6 to a point above the chamber 5.

A pipe 37 projects down from the fuel intake 8 to a point below a plate 38 fitted in the chamber 5 above the float, said plate extending over the entire cross-sectional area of the chamber and being solid except for the necessary openings to permit of the passage of the members 37, 14 and 31, and a free flow of air, therethrough.

In this manner, the fuel from intake 8 is delivered into the chamber 5 below the plate, and the inevitable spray formed by the falling fuel striking the float, cannot be drawn up through the pipe 9. This is a common occurrence with ordinary vacuum tanks, and a source of loss of fuel.

The device is preferably installed in the location previously occupied by the original vacuum tank, or so that the casing A may be mounted on the dashboard as are the other instruments. The only parts to be changed to suit different models of cars are the rod 21 and sleeve 22, the lengths of which might have to be altered.

The operation of the device is as follows:

Assume to start that the upper and metering chamber 5 has just become filled, the float 33 being then of course near the top of the chamber. This raising of the float, in the manner hereinafter seen, has caused the sundry valves to be moved so that the opening 10 is closed, the air vent 11 is opened, and the passage 12 leading from chamber 5 into chamber 6, is also open, as shown in Fig. 1

No more liquid will then enter the chamber 5 from the supply pipe 7, but said fluid is free to flow into chamber 6, and thence to the carbureter, by reason of the open fluid passage 12 and the open air vent 11 in the chamber 5.

The opening 8 does not require a valve, since the main supply tank being at a level lower than that of said opening, there will be no flow through pipe 7 unless the air pressure in the supply tank is greater than that in the chamber 5, which is not the case as soon as the vent 11 is opened.

These positions of the valves will be maintained irrespective of any float movement until the float, with a lowering of the liquid level, reaches and bears down on the lower stop 32 on the stem 31. The weight of the float on the stop will cause the stem 31 and lever 27 to be lowered, against the resistance of the spring 28, until said lever has passed its dead center position. The said spring will then act to immediately and quickly lower the lever 27 still further, regardless of the speed of lowering of the float.

Figure 2:
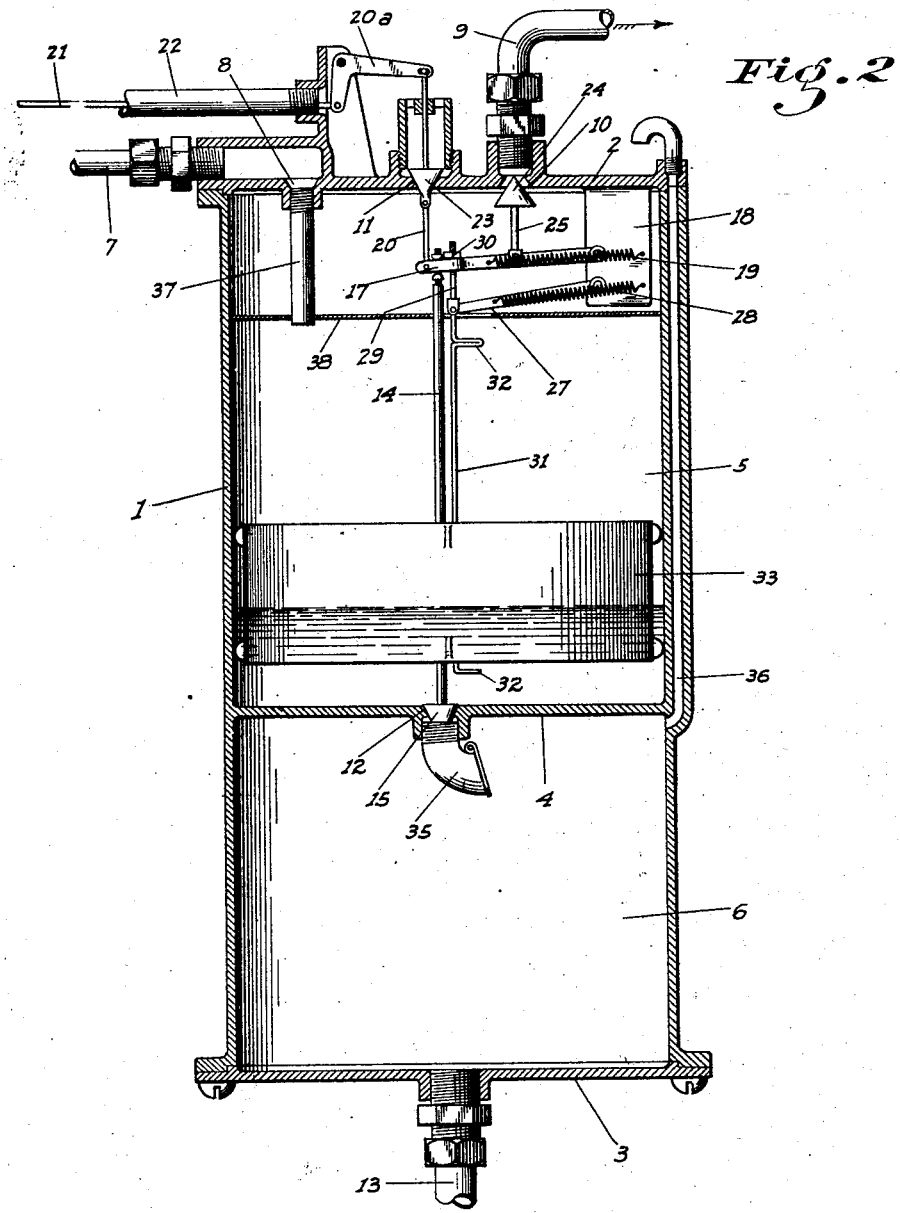
Fig. 2 is a similar view, the float being down and the metering chamber empty.

Just about at the time the spring 28 thus begins to function, the head 30 abuts against the lever 17, and with the further lowering of the lever 27, lever 17 is lowered also, the spring 28 being strong enough to overcome the resistance of the spring 19. This lowering of the lever 17, which takes place in an instant and automatically, causes, as will be evident, a reversal of position of the different valves mounted therewith, as shown in Fig. 2.

In other words the valves 15 and 23 become closed, and the valve 24 is opened, the seating of the former valves of course stopping further downward movement of both levers.

The valve 15 being closed, no more liquid can pass into the chamber 6, the engine using what is in said chamber until the valve 15 is again opened.

The fuel supply and suction pipe valves being open and the air vent closed, there is then nothing to prevent drawing the fuel through the pipe 7 into the chamber 5 with the aid of the engine suction in the pipe 9.

As the fuel fills said chamber, the float raises and finally bears against and raises the upper stop 32 of the stem 31. The lifting power of the float then causes the lever 27 to be raised past its dead center or until the shoulder of the stem 29 bears against the under face of the lever 17. Then, as in the previous operation, the spring 28 exerts its force to pull not only itself, but the lever 17, upwardly regardless of the float, causing a reversal of the valves to the positions originally occupied, as shown in Fig. 1.

Due to the somewhat free mounting of the stem 14 of the valve 15, both this valve and the valve 23 are enabled to seat snugly in their respective openings, regardless of whether or not one valve seats with exactly the same amount of lever movement as the other.

It will be noted that with alternate vertical movements of the stem 20, the pull rod 21 is moved to actuate an indicating mechanism. In other words, with each filling or emptying of the chamber 5, a visible record or the amount consumed is had.

The pull rod is shown as functioning when the stem 20 is raised, but it is obvious that by rearrangement of the bell crank, a reversal of functioning of the pull-rod will of course be had.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A vacuum tank including a chamber, fuel inlet and suction pipes leading thereto, the intake pipe terminating in the chamber at a plane lower than the suction pipe, and a solid plate across the chamber above the termination of the intake pipe and below the termination of the suction pipe and through which the inlet pipe passes with a close fit, said plate being orificed at a point removed from the intake and suction pipes.

2. A vacuum tank device comprising a chamber having fluid intake and outlet openings, air vent and suction openings, valves for controlling a flow through said air vent and suction openings in predetermined relation, a lever to which said valves are connected, means automatically holding said lever in one or the other of its limits of position, a float in the chamber, a trip lever alternately moved in opposite directions by said float, and means between said trip lever and the first named lever for causing the latter to be alternately thrown with the alternate movements of said trip lever.

3. A vacuum tank device comprising a chamber having fluid intake and outlet openings, air vent and suction openings, valves for controlling a flow through said air vent and suction openings in predetermined relation, a lever to which said valves are connected, spring means automatically holding said lever in one or the other of its limits of position, a float, a trip lever alternately moved in opposite directions by said float, and adapted to engage and move the first named lever with such movement, and spring means acting to hold said trip lever at one or the other of its limits of position, said trip lever spring being stronger than the spring means of the first named lever.

4. A vacuum tank device comprising a chamber having fluid intake and outlet openings, air vent and suction openings, valves for controlling a flow through said air vent and suction openings in predetermined relation, a lever to which said valves are connected, spring means automatically holding said lever in one or the other of its limits of position, a float, a trip lever alternately moved in opposite directions by said float, and adapted to engage and move the first named lever with such movement, and means acting on said trip lever to cause the same to continue its movement in either direction independent of the float after the latter has moved said trip lever a predetermined distance.

5. A vacuum tank device comprising a chamber having fluid intake and outlet openings, air vent and suction openings, valves for controlling a flow through said air vent and suction openings in predetermined relation, a lever to which said valves are connected, spring means automatically holding said lever in one or the other of its limits of position, a float, a trip lever adapted to engage the first named lever to move the same in opposite directions alternately, spring means acting to hold said trip lever at one or the other of its limits of position, a stem depending from said trip lever, and stops on said stem alternately engaged by the float when the latter is near the opposite limits of its vertical travel.

6. In a vacuum tank having spaced fuel intake and suction openings in the cover thereof, a pipe projecting down from the intake opening a certain distance to deliver the fuel into the tank in a plane below that of the suction opening, and a plate across the tank below said opening through which said pipe passes, the greater portion of the area of the plate being solid.

In testimony whereof I affix my signature.

LOUIS B. HARVEY.